US011748219B1

(12) United States Patent
Shah et al.

(10) Patent No.: US 11,748,219 B1
(45) Date of Patent: Sep. 5, 2023

(54) APPLICATION EVENT LOGGING AUGMENTATION

(71) Applicant: International Business Machines Corporation, Armonk, NY (US)

(72) Inventors: Ishaan Nikhil Shah, Pune (IN); Seema Nagar, Bangalore (IN); Pooja Aggarwal, Bengaluru (IN); Pratibha Moogi, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/944,615

(22) Filed: Sep. 14, 2022

(51) Int. Cl.
*G06F 11/22* (2006.01)
*G06F 11/34* (2006.01)

(52) U.S. Cl.
CPC ...... *G06F 11/2268* (2013.01); *G06F 11/3495* (2013.01)

(58) Field of Classification Search
CPC .......................... G06F 11/2268; G06F 11/3495
USPC .......................................................... 714/6.3
See application file for complete search history.

(56) References Cited

U.S. PATENT DOCUMENTS

| | | | |
|---|---|---|---|
| 2016/0124823 A1 | 5/2016 | Ruan et al. | |
| 2020/0135209 A1* | 4/2020 | Delfarah | G10L 17/04 |

FOREIGN PATENT DOCUMENTS

| | | |
|---|---|---|
| CN | 109861844 A | 6/2019 |
| CN | 113139712 A | 7/2021 |
| WO | 2022042126 A1 | 3/2022 |

OTHER PUBLICATIONS

Cinque et al., Assessing and improving the effectiveness of logs for the analysis of software faults, 2010 IEEE/IFIP International Conference on Dependable Systems & Networks (DSN), Jun. 28, 2010-Jul. 1, 2010.
Yuan et al., Be Conservative: Enhancing Failure Diagnosis with Proactive Logging, Oct. 2012.
Briggs, Bert for Measuring Text Similarity, May 5, 2021, https://towardsdatascience.com/bert-for-measuring-text-similarity-eec91c6bf9e1.
Zhao et al., Log20: Fully Automated Optimal Placement of Log Printing Statements under Specified Overhead Threshold, SOSP '17, Oct. 28, 2017.
Fu et al., Where Do Developers Log? An Empirical Study on Logging Practices in Industry, ICSE'14, May 31-Jun. 7, 2014.

(Continued)

*Primary Examiner* — Yair Leibovich
(74) *Attorney, Agent, or Firm* — Garg Law Firm, PLLC; Rakesh Garg; Nicholas Welling

(57) ABSTRACT

Responsive to determining that a step in an interaction sequence has below a threshold similarity to any step in a set of log sequences, a first log entry is caused to be generated. The first log entry is emitted responsive to execution of the step in the interaction sequence by the software application. Responsive to determining that a starting key action lacks a corresponding ending key action, a second log entry is caused to be generated. The second log entry is emitted responsive to execution of code related to the corresponding ending key action by the software application. Responsive to determining, using a trained anomaly detection model, that a keyword related to an injected fault is not present in resulting fault log data, a third log entry is generated. The third log entry is emitted responsive to execution of code related to the keyword by the software application.

20 Claims, 10 Drawing Sheets

(56) References Cited

OTHER PUBLICATIONS

Zhu et al., Learning to Log: Helping Developers Make Informed Logging Decisions, May 2015.
Li et al., Where Shall We Log? Studying and Suggesting Logging Locations in Code Blocks, 35th IEEE/ACM International Conference on Automated Software Engineering (ASE '20), Sep. 21-25, 2020.
Yuan et al., Improving Software Diagnosability via Log Enhancement, ASPLOS'11, Mar. 5-11, 2011.
Liu et al., Which Variables Should I Log?, Sep. 17, 2019, IEEE Transactions on Software Engineering, vol. 47, No. 9, Sep. 1, 2021.
Mizouchi et al., PADLA: a Dynamic Log Level Adapter Using Online Phase Detection, 2019 IEEE/ACM 27th International Conference on Program Comprehension (ICPC), 2019.

* cited by examiner

*Fig. 6*

SEQUENCE GAP BASED LOG GENERATION PSEUDOCODE
610

- Input: LogData, ServiceDescription, ServiceInteraction
- Output: Service, Log Line
- Algorithm:
  LogTemplates = Templatise(LogData)
  LogSeqData = GenerateSeq(LogTemplates)
  BusSeqData = GenerateSeq(ServiceInteraction)
  Output = [ ]
  For BusStep in BusSeqData:
      Found = false
      For LogStep in LogsSeqData
          Sim = GetSimilarity(BusStep, LogStep)
          If Sim > Threshold:
              Found = True If not Found:
          Output.append([Service, GenerateLog(Step, ServiceDescription)])

*Fig. 7*

KEY ACTION GAP BASED LOG GENERATION PSEUDOCODE
710

```
For i in range (len(LogSeqData)):
    Found = false
    KeyAction, StartStatus = ExtractKeyAction(LogSeqData[i])
    For j in range(len(i+1, len(LogSeqData)):
        NewKeyAction,_ = ExtractKeyAction(LogSeqData[j])
        If NewKeyAction == KeyAction:
            Found = True If not Found:
        Output.append([Service, GenerateLog(KeyAction, StarStatus, ServiceDescription)])
```

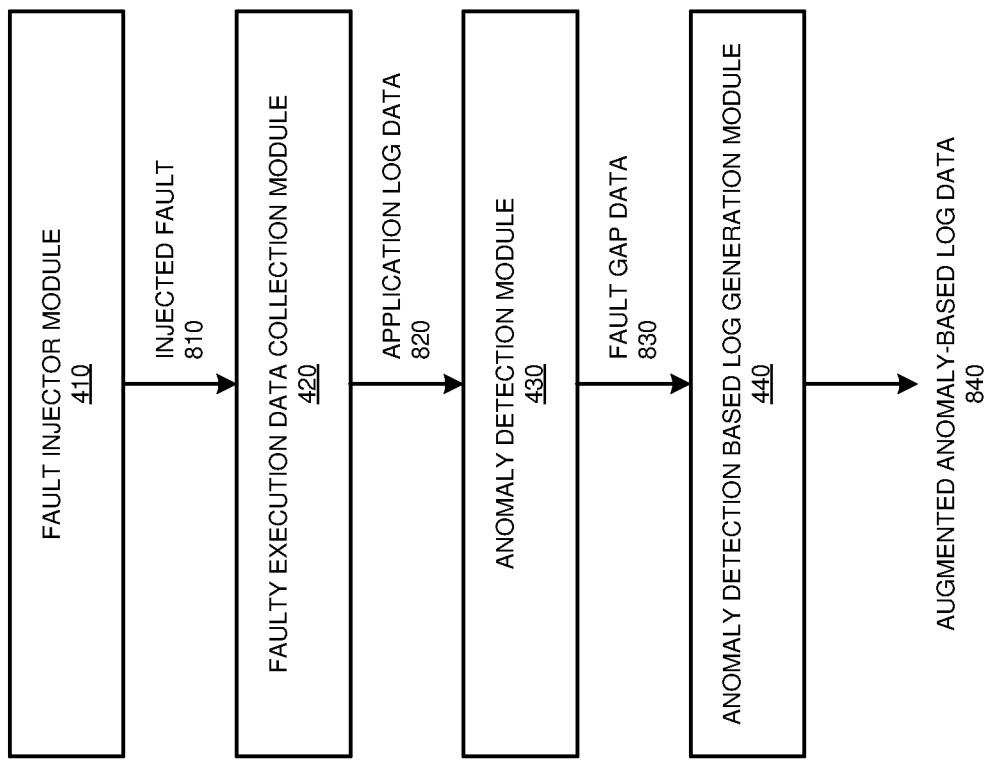

APPLICATION EVENT LOGGING AUGMENTATION

BACKGROUND

The present invention relates generally to a method, system, and computer program product for event logging in a software application. More particularly, the present invention relates to a method, system, and computer program product for application event logging augmentation.

In computing, an event log (or simply log) is a record of events that occur as a software application executes. For example, one entry in an event log might be "training started" and another entry might be "training completed". Event log entries typically include a time stamp indicating when the logged event occurred and a module tag indicating which module of an application generated the logged event, but neither is required and some event log entries include more or less data. Entries in an event log are typically in natural language or structured text form, or a combination, but other formats are also possible. Entries in an event log are also referred to as log lines, even though they may be longer than one line of text in length. The records in an event log provide an audit trail that can be used to understand system or application activity, particularly for applications distributed across multiple systems or with infrequent user interactions. For example, events recorded in an event log can be used to help determine what conditions caused a software error or unacceptable application performance, as well as the context in which the problem occurred. As well, log data is an important input to artificial intelligence for information technology (IT) operations (AIOps) implementations, in which data analytics, machine learning, and other artificial intelligence technologies are used to perform event grouping, fault localization, anomaly detection, outage prediction, and other IT operations tasks.

SUMMARY

The illustrative embodiments provide a method, system, and computer program product. An embodiment includes a method that extracts, from log data of a software application, a set of log sequences, a log sequence in the set of log sequences comprising a group of events that occur in order more than a threshold number of times in the log data. An embodiment extracts, from interaction data of a plurality of modules of the software application, an interaction sequence. An embodiment causes generating of, responsive to determining that a step in the interaction sequence has below a threshold similarity to any step in the set of log sequences, using the step in the interaction sequence and a trained text generation model, a first log entry, the first log entry emitted responsive to execution of the step in the interaction sequence by the software application. An embodiment extracts, from the set of log sequences, a set of key actions, a key action in the set of key actions comprising a logged event with a status. An embodiment causes generating of, responsive to determining that a starting key action in the set of key actions lacks a corresponding ending key action, a second log entry, the second log entry emitted responsive to execution of code related to the corresponding ending key action by the software application. An embodiment records, during execution of the software application with an injected fault, fault log data of the software application. An embodiment causes generating of, responsive to determining, using a trained anomaly detection model, that a keyword related to the injected fault is not present in the fault log data, a third log entry, the third log entry emitted responsive to execution of code related to the keyword by the software application.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts pseudocode of an example configuration for application event logging augmentation in accordance with an illustrative embodiment;

FIG. 7 depicts pseudocode of an example configuration for application event logging augmentation in accordance with an illustrative embodiment;

FIG. 8 depicts a flow diagram of an example configuration for application event logging augmentation in accordance with an illustrative embodiment;

DETAILED DESCRIPTION

Figure 1:
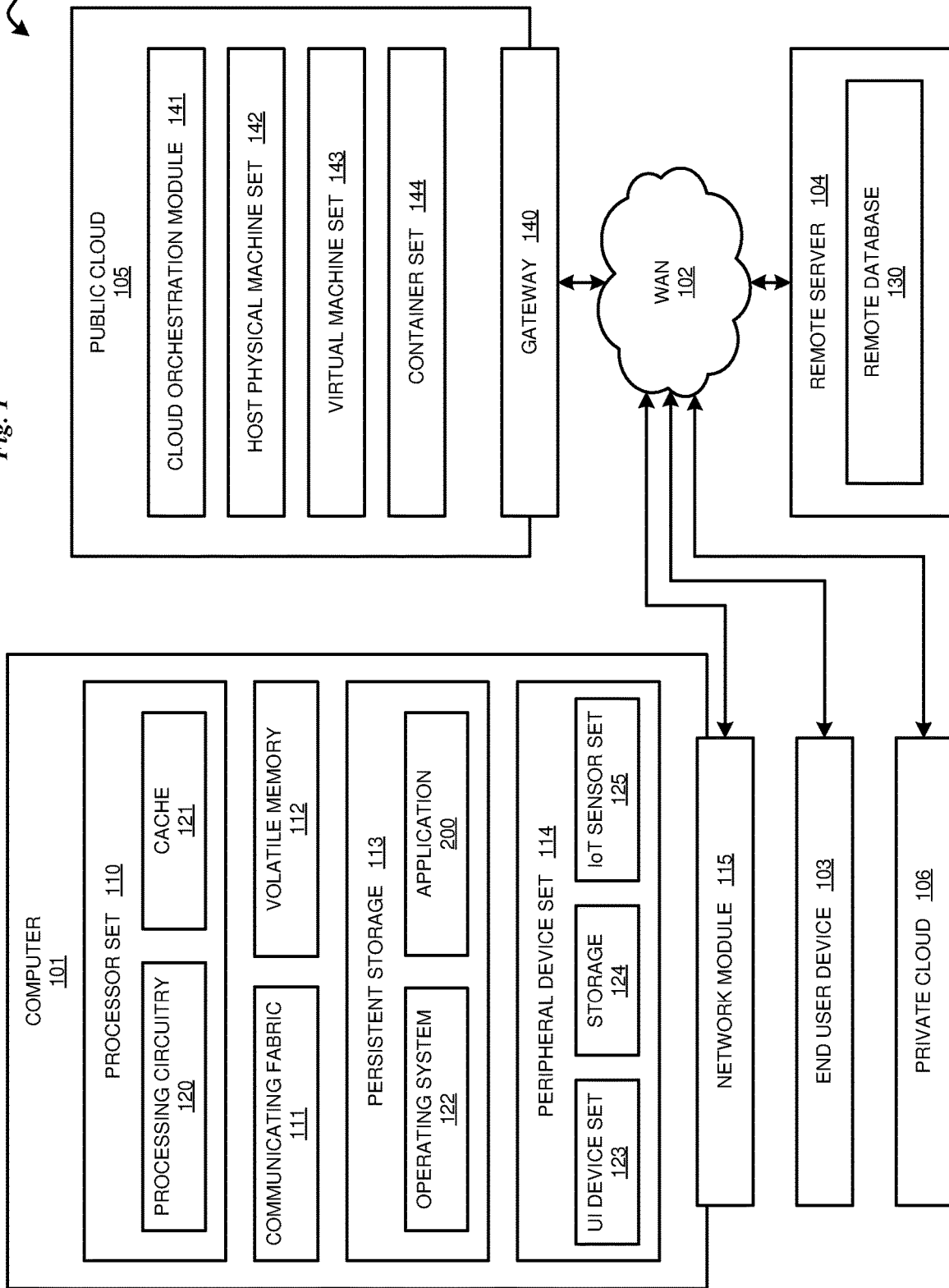
FIG. 1 depicts an example diagram of a data processing environment in which illustrative embodiments may be implemented.

The illustrative embodiments recognize that, although software event logs are an important data source, log quality is inconsistent across applications. Not all events that are important in debugging may have been logged. Alternatively, events helpful in debugging might have been logged, but other events which could be useful in event grouping, fault localization, anomaly detection, outage prediction, and other AIOps tasks might not have been logged. Some applications support different levels of detail for event logging, but the different levels of detail might not be accurately or consistently defined. Because applications are often implemented modularly, an application module might not support logging at all. In addition, as the volume of log data grows, finding relevant data becomes more difficult. Thus, the illustrative embodiments recognize that there is a need to identify gaps in logging in software systems and suggest log entries, or lines, to fill these gaps.

The illustrative embodiments also recognize that current solutions for identifying and filling logging gaps require access to application source code. However, application source code is often unavailable to human support personnel or as an input to AIOps-related analyses. Thus, the illustrative embodiments recognize that there is a need to identify gaps in logging in software systems and provide augmented logging to fill these gaps without having access to application source code.

The illustrative embodiments recognize that the presently available tools or solutions do not address these needs or provide adequate solutions for these needs. The illustrative embodiments used to describe the invention generally address and solve the above-described problems and other problems related to application event logging augmentation.

An embodiment can be implemented as a software application. The application implementing an embodiment can be configured as a modification of an existing application event logging system, as a separate application that operates in conjunction with an existing application event logging system, a standalone application, or some combination thereof.

Particularly, some illustrative embodiments provide a method that updates a software application, responsive to determining that a step in an interaction sequence has below a threshold similarity to any step in a set of log sequences derived from log data of the application, generates a log entry corresponding to execution of the step in the interaction sequence, updates the software application, responsive to determining that a starting key action in a set of key actions extracted from the log data lacks a corresponding ending key action, the software application generates a second log entry corresponding to execution of the ending key action, and updates the software application, responsive to determining that a keyword related to an injected fault is not present in log data generated while executing the application with the injected fault, to generate a log entry corresponding to the keyword.

An embodiment receives log data of a target application. A target application is a software application for which log data is to be augmented. The log data is a record of events that occurred during execution of the target application. In one embodiment, the log data is received while the target application is executing. In another embodiment, the log data is collected while the target application is executing, and received at the embodiment for analysis at a later time.

An embodiment constructs, from the log data, a templated version of the log data. In the templated version, placeholders replace identifiers of particular users, systems, resources, timestamps, and other data specific to an individual log entry or set of log entries. In other words, the templated version is a generic version of log data, which could be used to generate a log entry of a specific event by replacing a placeholder with corresponding event-specific data. For example, if one log entry is "10:05 PM GMT, Aug. 16, 2000: User A logged in", the corresponding templated version might be "[timestamp]: [user] logged in". Techniques for generated a templated version of log data (for example, Drain3) are presently known.

An embodiment extracts log sequences from the templated version of the log data. A log sequence is a templated group of logged events that occur, in order, more than a threshold number of times, in the templated version of the log data. For example, one log sequence in log data of a shopping application might be "[user] logged in, [item] viewed, [item] placed in cart, payment processed, [item] queued for shipping, [user] logged out". Techniques for extracting sequences from log data (for example, the Apriori algorithm and related techniques) are presently known.

An embodiment extracts interaction sequences from interaction data of the target application. Interaction data of the target application is data of interactions between modules of the application. For example, if the target application is implemented in a distributed manner, with modules executing in different systems, a presently available traffic monitoring technique is usable to collect transaction data between the modules as they communicate. For example, an online shopping application might be implemented using four modules, one providing a login service, one providing a shopping cart service, one providing a payment service, and one providing a user interface and communications with the other services. Each module is implemented in a different system. In a typical usage pattern, the user interface first transacts with the login service to process the user's login, then with the shopping cart service to process the user's addition of an item to the shopping cart, then with the payment service to process the user's payment for the item to the shopping cart. During the usage pattern, the target application collects data of the interactions between the modules. Techniques are presently available to collect interaction data. One non-limiting example of such a technique uses a service mesh, a dedicated infrastructure layer for facilitating service-to-service communications between services or microservices in an application implemented using services or microservices. A data plane of the service mesh data plane intercepts calls between different services and processes them, recording the data for later analysis at the same time. One embodiment uses a frequent sequence mining algorithm, a presently available technique, to extract interaction sequences from interaction data. Other techniques to extract interaction sequences from interaction data are also presently available.

Another embodiment extracts interaction sequences from module description data of the target application. For example, an architecture diagram might depict interactions between modules, or a natural language description of the target application, in a user manual or installation guide, might describe functions of various application modules and interactions between the modules. One embodiment uses action detection and relationship linking using natural language processing, presently available techniques, to interpret both structured and natural language text, in a variety of human languages, and extract interaction sequences from the resulting data. Other techniques to interpret both structured and natural language text, in a variety of human languages, and extract interaction sequences from the resulting data, are also presently available.

Another embodiment extracts interaction sequences from source code of the target application, if source code is available. Techniques are presently available to analyze source code in various computer languages and use the analysis results to determine interaction sequences among modules of an application.

An embodiment determines the similarity between an interaction sequence and one or more of the log sequences. To determine sequence similarity, one embodiment uses a presently available trained text encoding model to convert each step in an interaction sequence to a corresponding encoding. The embodiment also uses the same trained text encoding model to convert each step in a log sequence to a corresponding encoding. Then, for an encoded step in the interaction sequence, the embodiment computes a similarity between the encoded step in the interaction sequence and each of the encoded steps in the log sequence, and uses the computed similarities to determine if there is an encoded step in the log sequence that has above a threshold amount of similarity to the encoded step in the interaction sequence. Techniques (e.g., Bidirectional Encoder Representations from Transformers (BERT), a transformer-based machine learning technique for natural language processing) are presently available to convert a portion of text, such as a logged step in a sequence, to a corresponding encoding. The encoding is typically a multidimensional number representing a point in a vector space. The model is trained to select encodings such that the similarity between encodings is proportional to the similarity between portions of text used to generate the encodings. Thus, text similarity can be measured by computing cosine similarity, or another presently known technique, between encodings.

If no sufficiently similar step is found, this is an event that should have been logged (and thus present in the log sequence data) but was not. As a result, an embodiment uses a presently known technique (e.g., Generative Pre-trained Transformer 2 (GPT-2), or GPT-3, autoregressive language models that are trained to generate natural language text) to generate a log entry corresponding to execution of the step in the interaction sequence. One embodiment, with an ability to modify the target application, uses a presently available technique to insert code into the target application. The inserted code causes the application to emit the generated log entry when the target application executes the step in the interaction sequence. Another embodiment, without an ability to modify the target application but with an ability to monitor execution of the target application, determines, from monitoring execution of the target application, that the target application has executed the step in the interaction sequence. The embodiment generates a log entry corresponding to execution of the step (without modifying the application), and uses a presently available technique to insert the generated log entry into a stream of log entries generated by the application itself. For example, in one application execution monitoring implementation using containers, each container executing an application component has a corresponding container monitoring process that collects data of application execution events and log entries emitted by an application component. Thus, the container monitoring process has sufficient data to determine that a target application has executed a step in the interaction sequence and generate a corresponding log entry. In the implementation, each node on which containers execute also executes a collector service to collect log entries from the node's container monitoring processes. The collector service sends collected log entries to a log aggregator, which stores log data for additional analysis.

An embodiment extracts key actions and their statuses from the log sequences. A key action is a logged event with a status, such as "started", "step 2 of 5", or "ended". For example, one logged key action might be "model training started" and another logged key action might be "model training completed".

As it can be helpful in analyzing an application problem to distinguish between a process that completed normally and one that did not complete, an embodiment determines whether a key action logged with a starting status (a starting key action) has a matching key action logged with an ending status (an ending key action). If no matching end key action is found, an embodiment uses a presently known technique (e.g., GPT-2 or GPT-3) to generate a log entry corresponding to the missing end key action. One embodiment, with an ability to modify the target application, uses a presently available technique to insert code into the target application. The inserted code causes the application to emit the generated log entry when the target application executes code corresponding to the missing end key action. Another embodiment, without an ability to modify the target application but with an ability to monitor execution of the target application, determines, from monitoring execution of the target application, that the target application has executed code relating to the missing end key action. The embodiment generates a log entry corresponding to the missing end key action (without modifying the application), and uses a presently available technique to insert the generated log entry into a stream of log entries generated by the application itself.

An embodiment uses the application's log data to train an anomaly detection model to detect anomalies in log data. An anomaly is an other-than-normal operation of the target application. Some non-limited examples of anomalies are the application hanging, failing to locate a required resource within a predetermined time, and failing to respond to a user request within a predetermined time.

An embodiment injects a fault into the target application. In other words, the embodiment causes the target application to exhibit a known anomaly and generate corresponding log data. An embodiment collects the generated log data. Techniques for fault injection are presently known.

An embodiment uses the trained anomaly detection model and log data of the target application exhibiting the known anomaly to determine whether the resulting log data includes data of the injected fault. If not, the target application needs additional logging related to the fault, so that log data of the fault will be available if the fault occurs in the future. Thus, an embodiment tokenizes the log data. Tokenizing the log data breaks log data into smaller portions of text, such as words or phrases, for further processing. An embodiment determines whether a keyword related to the injected fault appears in the tokenized log data. If not, an embodiment uses the keyword, as well as one or more log entries used as models, to generate a log entry corresponding to the keyword using a presently known technique (e.g., GPT-2 or GPT-3). One embodiment, with an ability to modify the target application, uses a presently available technique to insert code into the target application. The inserted code causes the application to emit the generated log entry when the target application executes code related to the fault. Another embodiment, without an ability to modify the target application but with an ability to monitor execution of the target application, determines, from monitoring execution of the target application, that the target application has executed code related to the fault. The embodiment generates a log entry corresponding to the keyword (without modifying the application), and uses a presently available technique to insert the generated log entry into a stream of log entries generated by the application itself.

The manner of application event logging augmentation described herein is unavailable in the presently available methods in the technological field of endeavor pertaining to application event logging. A method of an embodiment described herein, when implemented to execute on a device or data processing system, comprises substantial advancement of the functionality of that device or data processing system in updating a software application, responsive to determining that a step in an interaction sequence has below a threshold similarity to any step in a set of log sequences derived from log data of the application, to generate a log entry corresponding to execution of the step in the interaction sequence, updating the software application, responsive to determining that a starting key action in a set of key actions extracted from the log data lacks a corresponding ending key action, the software application to generate a second log entry corresponding to execution of the ending key action, and updating the software application, responsive to determining that a keyword related to an injected fault is not present in log data generated while executing the application with the injected fault, to generate a log entry corresponding to the keyword.

The illustrative embodiments are described with respect to certain types of log data, interaction data, application data, sequences, key actions, keywords, log entries, text generation models, anomaly detection models, encodings, similarities, thresholds, tokens, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements an application event logging augmentation embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated. Further, application 200 is usable to update a target application executing in any of computer 101, end user device 103, remote server 104, or a computer in public cloud 105 or private cloud 106, and need not be executing in the same system as the target application.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112, for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
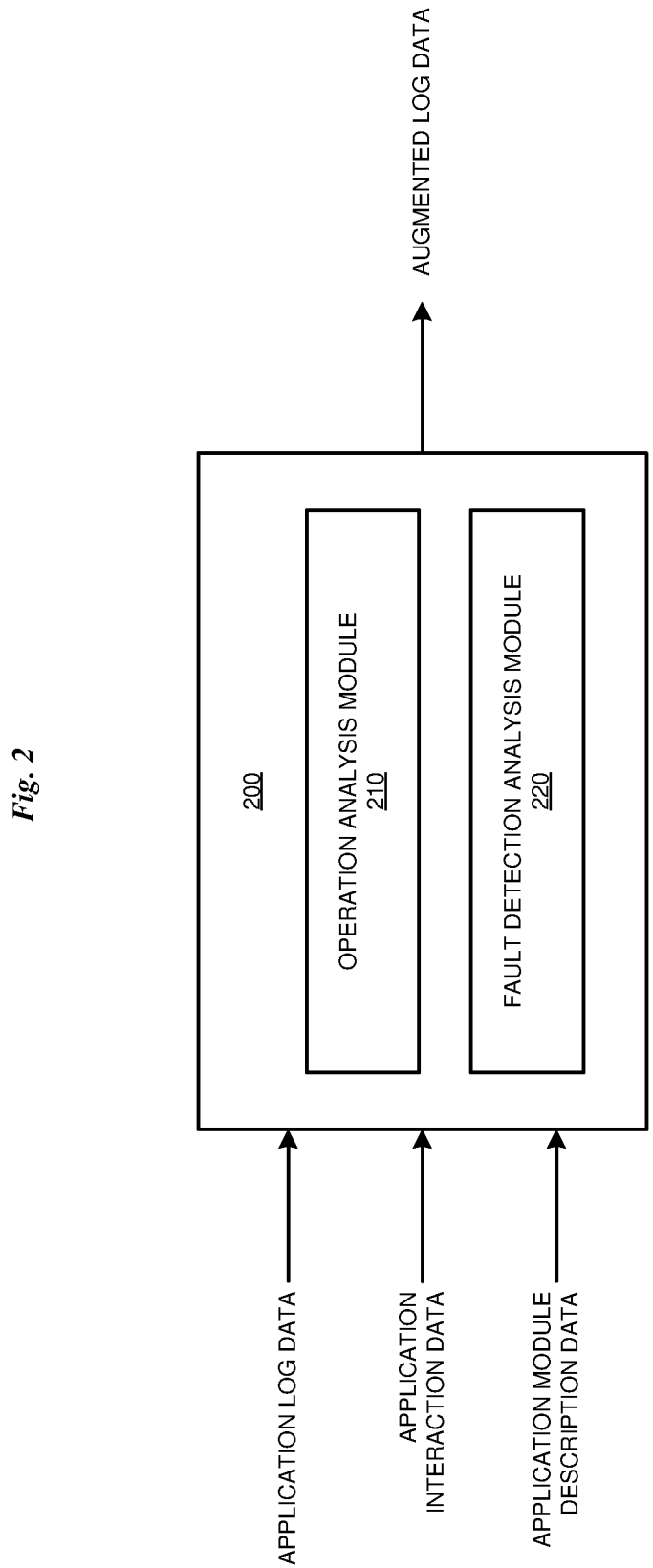
FIG. 2 depicts a block diagram of an example configuration for application event logging augmentation in accordance with an illustrative embodiment.

With reference to FIG. 2, this figure depicts a block diagram of an example configuration for application event logging augmentation in accordance with an illustrative embodiment. Application 200 is the same as application 200 in FIG. 1.

Application 200 receives log data of a target application. In one implementation of application 200, the log data is received while the target application is executing. In another implementation of application 200, the log data is collected while the target application is executing, and received at the embodiment for analysis at a later time. Application 200 also receives interaction data and module description data of the target application.

Operation analysis module 210 generates augmented log data of a target application using log data of normal operation of the target application. More detail of module 210 is depicted in FIG. 3.

Figure 4:
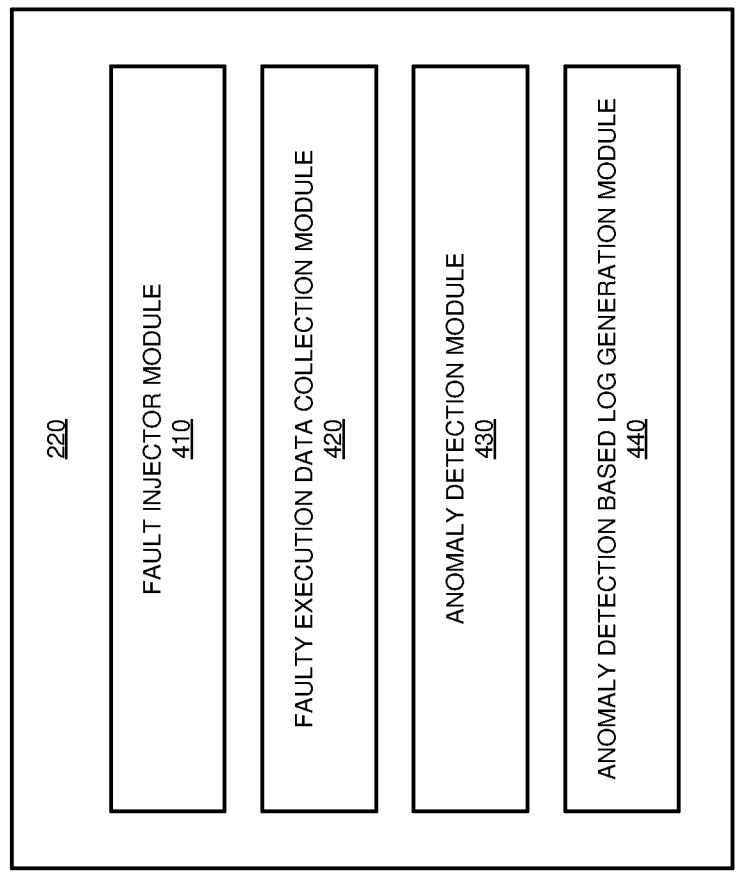
FIG. 4 depicts a block diagram of an example configuration for application event logging augmentation in accordance with an illustrative embodiment.

Fault detection analysis module 220 generates additional augmented log data of the target application, when the target application executes with a known fault. More detail of module 220 is depicted in FIG. 4.

Figure 3:
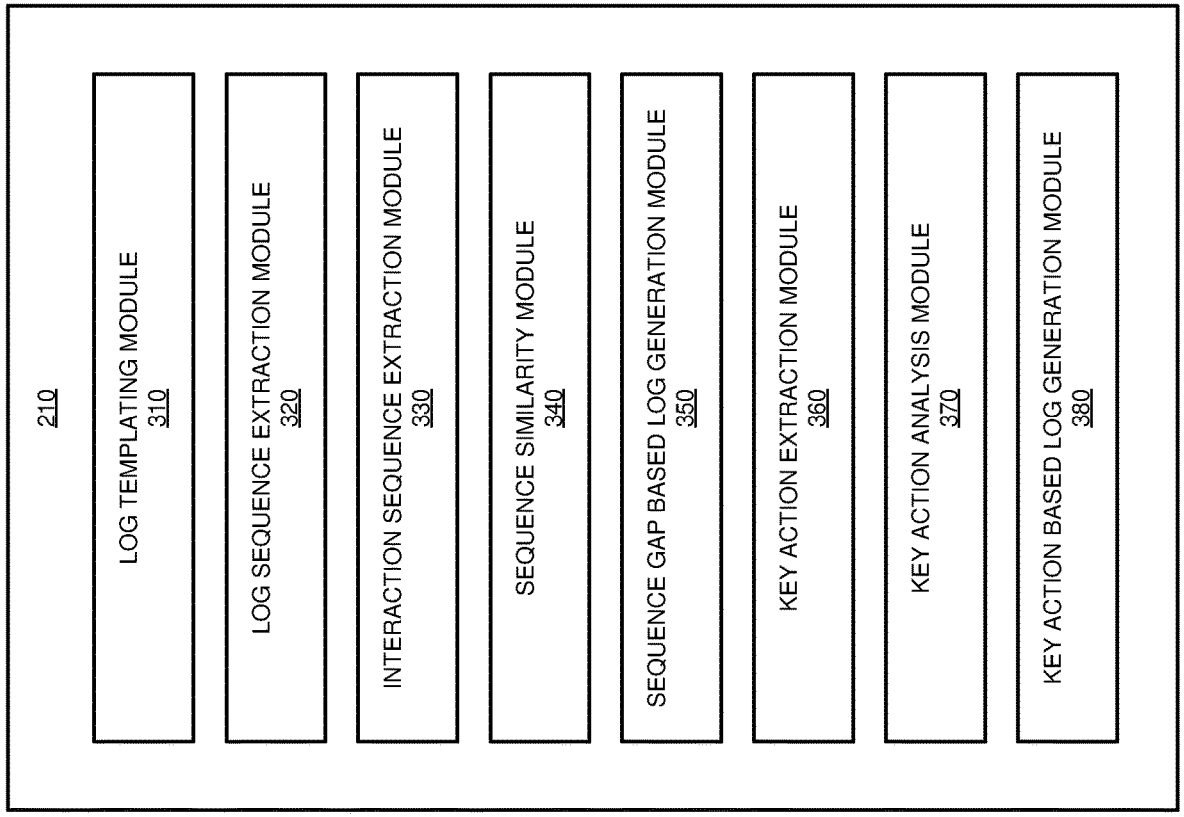
FIG. 3 depicts a block diagram of an example configuration for application event logging augmentation in accordance with an illustrative embodiment.

With reference to FIG. 3, this figure depicts a block diagram of an example configuration for application event logging augmentation in accordance with an illustrative embodiment. In particular, FIG. 3 depicts more detail of operation analysis module 210 in FIG. 2.

Log templating module 310 constructs, from log data of the target application, a templated version of the log data. In the templated version, placeholders replace identifiers of particular users, systems, resources, timestamps, and other data specific to an individual log entry or set of log entries. In other words, the templated version is a generic version of log data, which could be used to generate a log entry of a specific event by replacing a placeholder with corresponding event-specific data. For example, if one log entry is "10:05 PM GMT, Aug. 16, 2000: User A logged in", the corresponding templated version might be "[timestamp]: [user] logged in".

Log sequence extraction module 320 extracts log sequences from the templated version of the log data. A log sequence is a templated group of logged events that occur, in order, more than a threshold number of times, in the templated version of the log data. For example, one log sequence in log data of a shopping application might be "[user] logged in, [item] viewed, [item] placed in cart, payment processed, [item] queued for shipping, [user] logged out".

Interaction sequence extraction module 330 extracts interaction sequences from interaction data of the target application. Interaction data of the target application is data of interactions between modules of the application. For example, if the target application is implemented in a distributed manner, with modules executing in different systems, module 330 collects transaction data between the modules as they communicate. For example, an online shopping application might be implemented using four modules, one providing a login service, one providing a shopping cart service, one providing a payment service, and one providing a user interface and communications with the other services. Each module is implemented in a different system. In a typical usage pattern, the user interface first transacts with the login service to process the user's login, then with the shopping cart service to process the user's addition of an item to the shopping cart, then with the payment service to process the user's payment for the item to the shopping cart. During the usage pattern, the target application generates data of the interactions between the modules.

Another implementation of module 330 extracts interaction sequences from module description data of the target application. For example, an architecture diagram might depict interactions between modules, or a natural language description of the target application, in a user manual or installation guide, might describe functions of various application modules and interactions between the modules.

Another implementation of module 330 extracts interaction sequences from source code of the target application, if source code is available.

Sequence similarity module 340 determines a similarity between an interaction sequence and one or more of the log sequences. To determine sequence similarity, one implementation of module 340 uses a presently available trained text encoding model to convert each step in an interaction sequence to a corresponding encoding. The implementation of module 340 also uses the same trained text encoding model to convert each step in a log sequence to a corresponding encoding. Then, for an encoded step in the interaction sequence, the implementation of module 340 computes a similarity between the encoded step in the interaction sequence and each of the encoded steps in the log sequence, and uses the computed similarities to determine if there is an encoded step in the log sequence that has above a threshold amount of similarity to the encoded step in the interaction sequence. The encoding is typically a multidimensional number representing a point in a vector space, and the model is trained to select encodings such that similarity between encodings is proportional to similarity between portions of text used to generate the encodings.

If no sufficiently similar step is found, this is an event that should have been logged (and thus present in the log sequence data) but was not. As a result, sequence gap based log generation module 350 uses a presently known technique to generate a log entry corresponding to execution of the step in the interaction sequence. One implementation of module 350, with an ability to modify the target application, uses a presently available technique to insert code into the target application. The inserted code causes the application to emit the generated log entry when the target application executes the step in the interaction sequence. Another implementation of module 350, without an ability to modify the target application but with an ability to monitor execution of the target application, determines, from monitoring execution of the target application, that the target application has executed the step in the interaction sequence. The implementation generates a log entry corresponding to execution of the step (without modifying the application), and uses a presently available technique to insert the generated log entry into a stream of log entries generated by the application itself.

Key action extraction module 360 extracts key actions and their statuses from the log sequences. A key action is a logged event with a status, such as "started", "step 2 of 5", or "ended". For example, one logged key action might be "model training started" and another logged key action might be "model training completed".

Key action analysis module 370 determines whether a key action logged with a starting status has a matching key action logged with an ending status. If no matching end key action is found, key action based log generation module 380 uses a presently known technique to generate a log entry corresponding to the missing end key action. One implementation of module 380, with an ability to modify the target application, uses a presently available technique to insert code into the target application. The inserted code causes the application to emit the generated log entry when the target application executes code corresponding to the missing end key action. Another implementation of module 380, without an ability to modify the target application but with an ability to monitor execution of the target application, determines, from monitoring execution of the target application, that the target application has executed code relating to the missing end key action. The implementation generates a log entry corresponding to the missing end key action (without modifying the application), and uses a presently available technique to insert the generated log entry into a stream of log entries generated by the application itself.

With reference to FIG. 4, this figure depicts a block diagram of an example configuration for application event logging augmentation in accordance with an illustrative embodiment. In particular, FIG. 4 depicts more detail of fault detection analysis module 220 in FIG. 2

Fault injector module 410 injects a fault into the target application. In other words, module 410 causes the target application to exhibit a known anomaly and generate corresponding log data. Faulty execution data collection module 420 collects the generated log data.

Anomaly detection module 430 uses the updated application's log data to train an anomaly detection model to detect anomalies in log data. An anomaly is an other-than-normal operation of the target application. Module 430 uses the trained anomaly detection model and log data of the target application exhibiting the known anomaly to determine whether the resulting log data includes data of the injected fault. If not, the target application needs additional logging related to the fault, so that log data of the fault will be available if the fault occurs in the future.

Thus, anomaly detection based log generation module 440 tokenizes the log data. Module 440 determines whether a keyword related to the injected fault appears in the tokenized log data. If not, module 440 uses the keyword, as well as one or more log entries used as models, to generate a log entry corresponding to the keyword using a presently known technique (e.g., GPT-2 or GPT-3). One implementation of module 440, with an ability to modify the target application, uses a presently available technique to insert code into the target application. The inserted code causes the application to emit the generated log entry when the target application executes code related to the fault. Another implementation of module 440, without an ability to modify the target application but with an ability to monitor execution of the target application, determines, from monitoring execution of the target application, that the target application has executed code related to the fault. The implementation generates a log entry corresponding to the keyword (without modifying the application), and uses a presently available technique to insert the generated log entry into a stream of log entries generated by the application itself.

Figure 5:
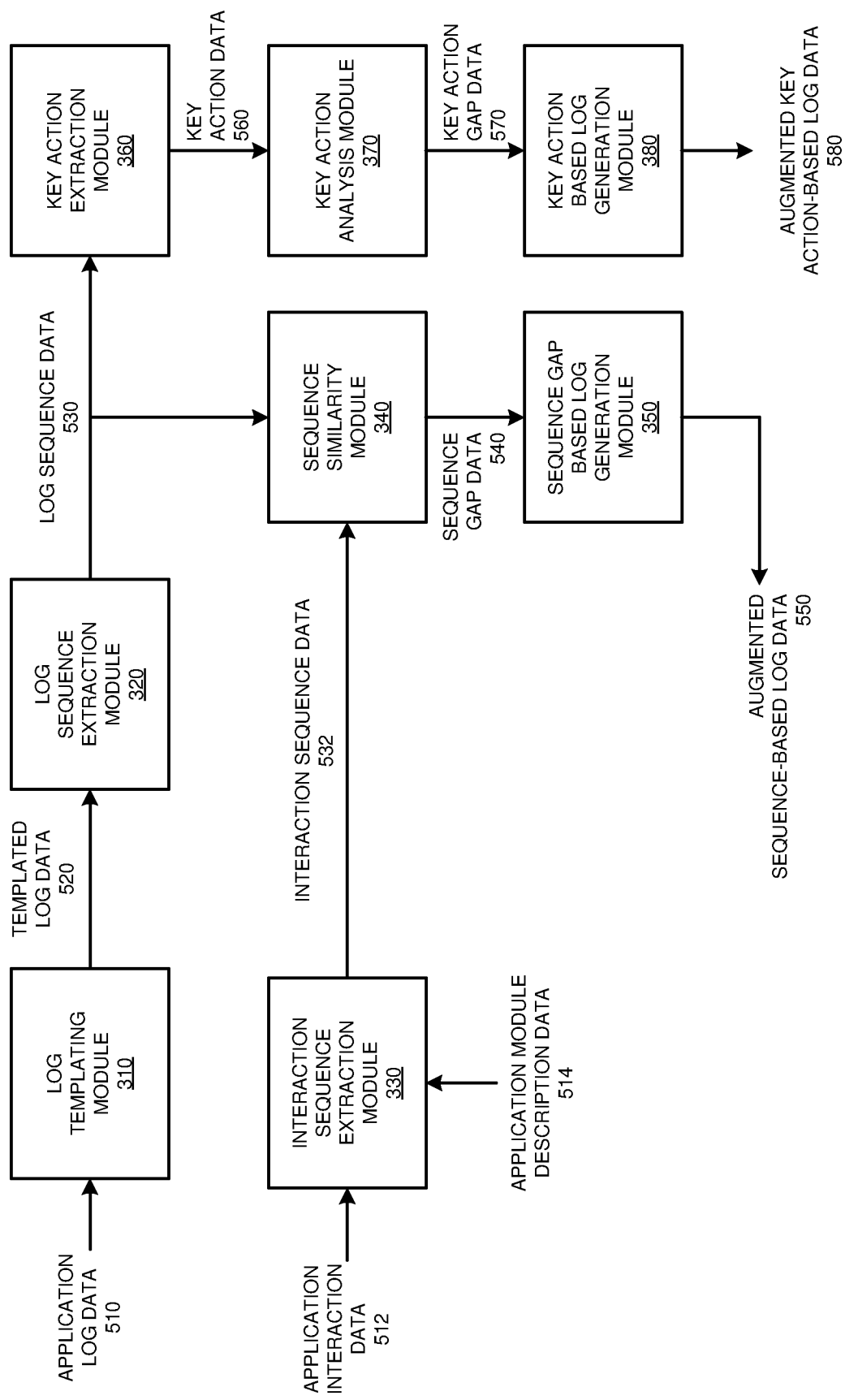
FIG. 5 depicts a flow diagram of an example configuration for application event logging augmentation in accordance with an illustrative embodiment.

With reference to FIG. 5, this figure depicts a flow diagram of an example configuration for application event logging augmentation in accordance with an illustrative embodiment. Log templating module 310, log sequence extraction module 320, interaction sequence extraction module 330, sequence similarity module 340, sequence gap based log generation module 350, key action extraction module 360, key action analysis module 370, and key action-based log generation module 380 are the same as log templating module 310, log sequence extraction module 320, interaction sequence extraction module 330, sequence similarity module 340, sequence gap based log generation module 350, key action extraction module 360, key action analysis module 370, and key action-based log generation module 380 in FIG. 3.

As depicted, log templating module 310 constructs, from application log data 510, templated log data 520. Log sequence extraction module 320 extracts log sequence data 530 from templated log data 520.

Interaction sequence extraction module 330 extracts interaction sequence data 532 from application interaction data 512 and application module description data 514. Sequence similarity module 340 determines a similarity between an interaction sequence in interaction sequence data 532 and one or more of the log sequences in log sequence data 530, generating sequence gap data 540. Sequence gap data 540 indicates whether or not there is sufficient similarity between an interaction sequence and one or more of the log sequences. Using sequence gap data 540, sequence gap based log generation module 350 generates augmented sequence-based log data 550—a log entry corresponding to execution of the step in the interaction sequence when the target application executes the step in the interaction sequence.

Key action extraction module 360 extracts key actions and their statuses from log sequence data 530, generating key action data 560. Key action analysis module 370 uses key action data 560 to determine whether a key action logged with a starting status has a matching key action logged with an ending status, generating key action gap data 570. Key action based log generation module 380 uses key action gap data 570 to generate augmented key action-based log data 580—a log entry corresponding to the missing end key action emitted when the target application executes code corresponding to the ending status of the key action.

With reference to FIG. 6, this figure depicts pseudocode of an example configuration for application event logging augmentation in accordance with an illustrative embodiment.

In particular, FIG. 6 depicts sequence gap based log generation pseudocode 610. The LogTemplates variable holds the results of log templating module 310. The LogSeqData variable holds the results of log sequence extraction module 320. The BusSeqData variable holds the results of interaction sequence extraction module 330. The Found variable holds the results of sequence similarity module 340, and the Output.append function performs the actions described with reference to sequence gap based log generation module 350.

With reference to FIG. 7, this figure depicts pseudocode of an example configuration for application event logging augmentation in accordance with an illustrative embodiment.

In particular, FIG. 7 depicts key action gap based log generation pseudocode 710. The LogSeqData variable holds the results of log sequence extraction module 320. The KeyAction,StartStatus variable holds a key action with a starting status determined by key action extraction module 360. The Found variable holds the results of key action analysis module 370, and the Output.append function performs the actions described with reference to key action-based log generation module 380.

With reference to FIG. 8, this figure depicts a flow diagram of an example configuration for application event logging augmentation in accordance with an illustrative embodiment. Fault injector module 410, faulty execution data collection module 420, anomaly detection module 430, and anomaly detection based log generation module 440 are the same as fault injector module 410, faulty execution data collection module 420, anomaly detection module 430, and anomaly detection based log generation module 440 in FIG. 4.

As depicted, fault injector module 410 injects injected fault 810 into the target application. Faulty execution data collection module 420 collects the resulting application log data 820. Anomaly detection module 430 uses a trained anomaly detection model and application log data 820 to determine whether the application log data 820 includes data of the injected fault, generating fault gap data 830. Anomaly detection based log generation module 440 uses fault gap data 830 to determine whether a keyword related to the injected fault appears in a tokenized version of log data 820. If not, module 440 uses the keyword, as well as one or more log entries used as models, to generate augmented anomaly-based log data 840—a log entry corresponding to the keyword emitted when the target application executes code related to the fault.

Figure 9A:
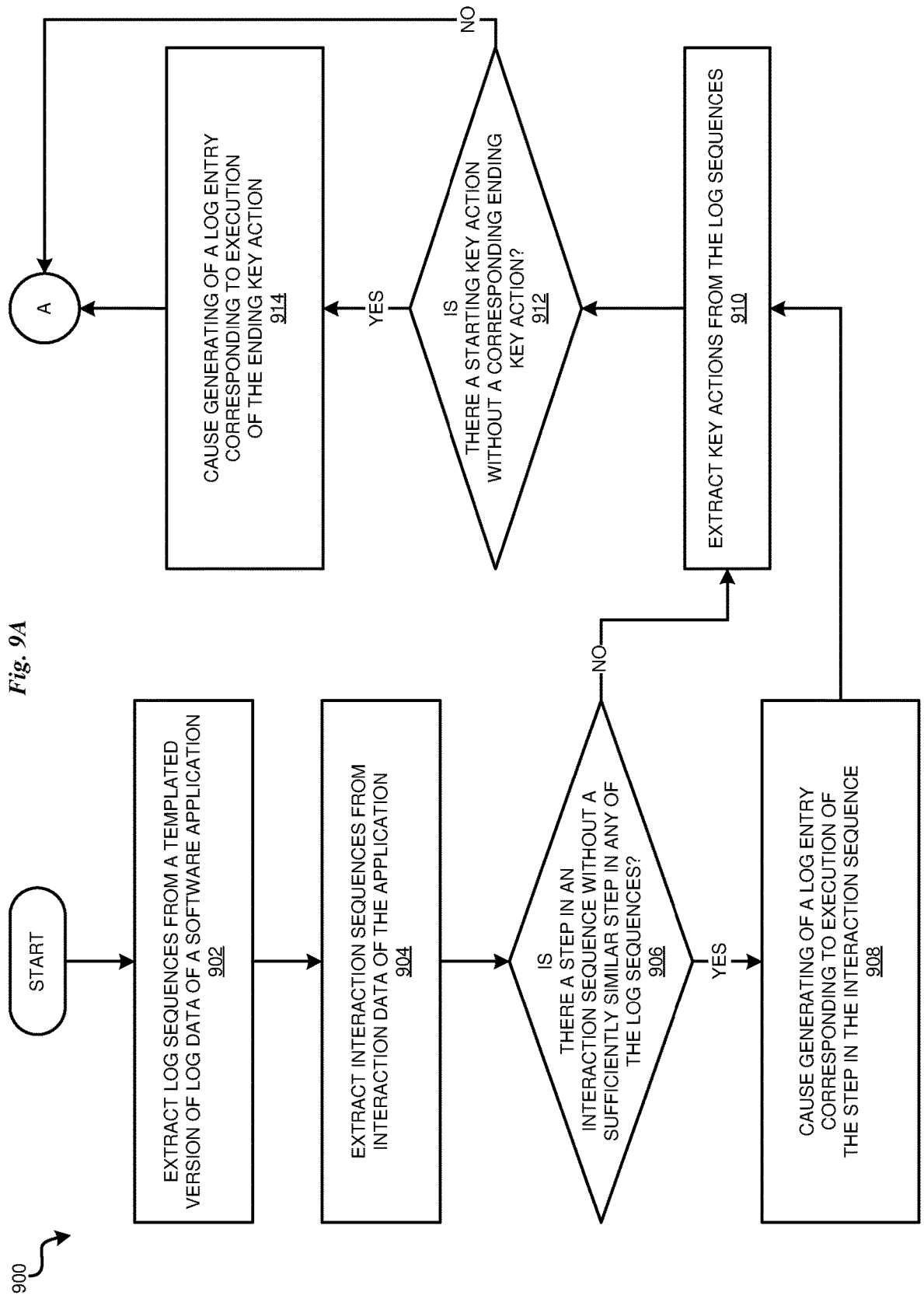
FIG. 9A depicts a flowchart of an example process for application event logging augmentation in accordance with an illustrative embodiment.

With reference to FIG. 9A, this figure depicts a flowchart of an example process for application event logging augmentation in accordance with an illustrative embodiment. Process 900 can be implemented in application 200 in FIG. 2.

In block 902, the application extracts log sequences from a templated version of log data of a software application. In block 904, the application extracts interaction sequences from interaction data of the application. In block 906, the application determines whether there is a step in an interaction sequence without a sufficiently similar step in any of the log sequences. If yes ("YES" path of block 906), in block 908, the application causes generating of a log entry corresponding to execution of the step in the interaction sequence. Then (also "NO" path of block 906), in block 910, the application extracts key actions from the log sequences. In block 912, the application determines whether there is a starting key action without a corresponding ending key action. If yes ("YES" path of block 912), in block 914, the application causes generating of a log entry corresponding to execution of the ending key action. Then (also "NO" path of block 912), the application reaches point A.

Figure 9B:
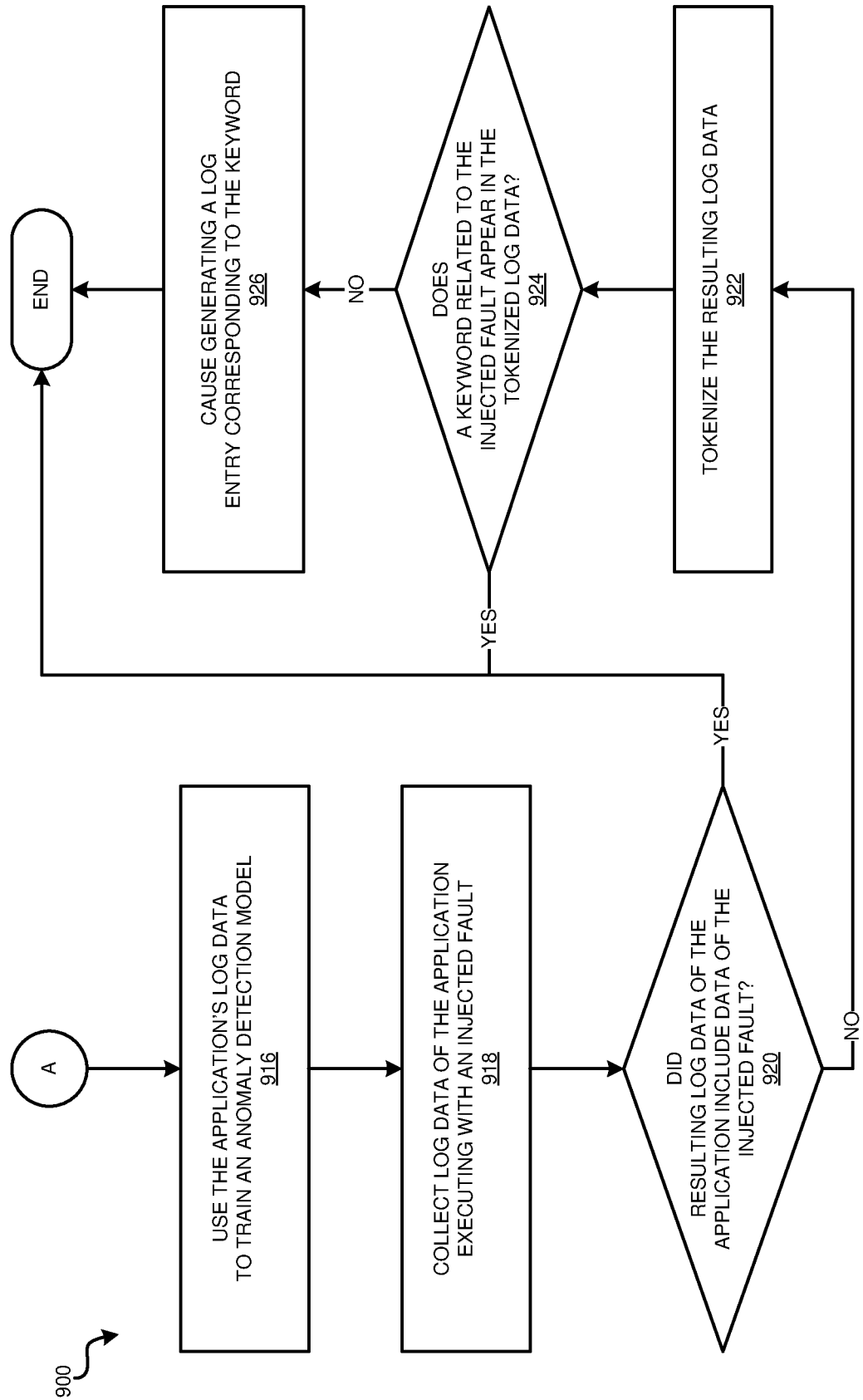
FIG. 9B depicts a continued flowchart of an example process for application event logging augmentation in accordance with an illustrative embodiment.

With reference to FIG. 9B, this figure depicts a continued flowchart of an example process for application event logging augmentation in accordance with an illustrative embodiment. Process 900 can be implemented in application 200 in FIG. 2. Point A is the same as point A in FIG. 9A.

In block 916, the application uses the application's log data to train an anomaly detection model. In block 918, the application collects log data of the application executing with an injected fault. In block 920, the application determines whether resulting log data of the application includes data of the injected fault. If not ("NO" path of block 920), in block 922 the application tokenizes the resulting log data. In block 924, the application determines whether a keyword related to the injected fault appears in the tokenized log data. If not ("NO" path of block 924), in block 926, the application causes generating a log entry corresponding to the keyword. Then (also "YES" paths of blocks 920 and 924) the application ends.

Thus, a computer implemented method, system or apparatus, and computer program product are provided in the illustrative embodiments for application event logging augmentation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
extracting, from log data of a software application, a set of log sequences, a log sequence in the set of log sequences comprising a group of events that occur in order more than a threshold number of times in the log data;
extracting, from interaction data of a plurality of modules of the software application, an interaction sequence;
causing generation of, responsive to determining that a step in the interaction sequence has below a threshold similarity to any step in the set of log sequences, using the step in the interaction sequence and a trained text generation model, a first log entry, the first log entry emitted responsive to execution of the step in the interaction sequence by the software application;
extracting, from the set of log sequences, a set of key actions, a key action in the set of key actions comprising a logged event with a status;
causing generation of, responsive to determining that a starting key action in the set of key actions lacks a corresponding ending key action, a second log entry, the second log entry emitted responsive to execution of code related to the corresponding ending key action by the software application;
recording, during execution of the software application with an injected fault, fault log data of the software application; and
causing generating of, responsive to determining, using a trained anomaly detection model, that a keyword related to the injected fault is not present in the fault log data, a third log entry, the third log entry emitted responsive to execution of code related to the keyword by the software application.

2. The computer-implemented method of claim 1, wherein the set of log sequences is extracted from a templated version of the log data.

3. The computer-implemented method of claim 1, wherein determining that the step in the interaction sequence has below a threshold similarity to any step in the set of log sequences comprises:
encoding, using a trained text encoding module, the step in the interaction sequence, the encoding resulting in an encoded interaction step;
second encoding, using the trained text encoding module, each step in the set of log sequences, the second encoding resulting in a set of encoded log steps; and
computing a similarity between the encoded interaction step and each of the set of encoded log steps.

4. The computer-implemented method of claim 1, further comprising: updating, by causing insertion of the first log entry into code of a first updated software application, the software application.

5. The computer-implemented method of claim 1, further comprising: updating, by causing insertion of the second log entry into code of t-e a first updated software application, the software application.

6. The computer-implemented method of claim 1, further comprising: training, using log data generated by the software application during execution of the software application, the anomaly detection model, the training resulting in the trained anomaly detection model.

7. The computer-implemented method of claim 1, wherein determining, using the trained anomaly detection model, that the keyword related to the injected fault is not present in the fault log data comprises:
determining, using the trained anomaly detection model, that a keyword related to the injected fault is not present in a tokenized version of the fault log data.

8. The computer-implemented method of claim 1, further comprising:
updating, by causing insertion of the third log entry into code of the software application, the software application.

9. A computer program product comprising one or more computer readable storage medium, and program instructions collectively stored on the one or more computer readable storage medium, the program instructions executable by a processor to cause the processor to perform operations comprising:
extracting, from log data of a software application, a set of log sequences, a log sequence in the set of log sequences comprising a group of events that occur in order more than a threshold number of times in the log data;
extracting, from interaction data of a plurality of modules of the software application, an interaction sequence;
causing generation of, responsive to determining that a step in the interaction sequence has below a threshold similarity to any step in the set of log sequences, using the step in the interaction sequence and a trained text generation model, a first log entry, the first log entry emitted responsive to execution of the step in the interaction sequence by the software application;
extracting, from the set of log sequences, a set of key actions, a key action in the set of key actions comprising a logged event with a status;
causing generation of, responsive to determining that a starting key action in the set of key actions lacks a corresponding ending key action, a second log entry, the second log entry emitted responsive to execution of code related to the corresponding ending key action by the software application;

recording, during execution of the software application with an injected fault, fault log data of the software application; and causing generation of, responsive to determining, using a trained anomaly detection model, that a keyword related to the injected fault is not present in the fault log data, a third log entry, the third log entry emitted responsive to execution of code related to the keyword by the software application.

10. The computer program product of claim 9, wherein the stored program instructions are stored in a computer readable storage device in a data processing system, and wherein the stored program instructions are transferred over a network from a remote data processing system.

11. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising: second program instructions to meter use of the program instructions associated with the request; and program instructions to generate an invoice based on the metered use.

12. The computer program product of claim 9, wherein the set of log sequences is extracted from a templated version of the log data.

13. The computer program product of claim 9, wherein determining that the step in the interaction sequence has below a threshold similarity to any step in the set of log sequences comprises:

encoding, using a trained text encoding module, the step in the interaction sequence, the encoding resulting in an encoded interaction step;

second encoding, using the trained text encoding module, each step in the set of log sequences, the second encoding resulting in a set of encoded log steps; and computing a similarity between the encoded interaction step and each of the set of encoded log steps.

14. The computer program product of claim 9, further comprising: updating, by causing insertion of the first log entry into code of a first updated software application, the software application.

15. The computer program product of claim 9, further comprising: updating, by causing insertion of the second log entry into code of a first updated software application, the software application.

16. The computer program product of claim 9, further comprising: training, using log data generated by the software application during execution of the software application, the anomaly detection model, the training resulting in the trained anomaly detection model.

17. The computer program product of claim 9, wherein determining, using the trained anomaly detection model, that the keyword related to the injected fault is not present in the fault log data comprises:

determining, using the trained anomaly detection model, that a keyword related to the injected fault is not present in a tokenized version of the fault log data.

18. The computer program product of claim 9, further comprising:

updating, by causing insertion of the third log entry into code of the software application, the software application.

19. A computer system comprising a processor and one or more computer readable storage media, and program instructions collectively stored on the one or more computer readable storage media, the program instructions executable by the processor to cause the processor to perform operations comprising:

extracting, from log data of a software application, a set of log sequences, a log sequence in the set of log sequences comprising a group of events that occur in order more than a threshold number of times in the log data;

extracting, from interaction data of a plurality of modules of the software application, an interaction sequence;

causing generation of, responsive to determining that a step in the interaction sequence has below a threshold similarity to any step in the set of log sequences, using the step in the interaction sequence and a trained text generation model, a first log entry, the first log entry emitted responsive to execution of the step in the interaction sequence by the software application;

extracting, from the set of log sequences, a set of key actions, a key action in the set of key actions comprising a logged event with a status;

causing generation of, responsive to determining that a starting key action in the set of key actions lacks a corresponding ending key action, a second log entry, the second log entry emitted responsive to execution of code related to the corresponding ending key action by the software application;

recording, during execution of the software application with an injected fault, fault log data of the software application; and causing generation of, responsive to determining, using a trained anomaly detection model, that a keyword related to the injected fault is not present in the fault log data, a third log entry, the third log entry emitted responsive to execution of code related to the keyword by the software application.

20. The computer system of claim 19, wherein the set of log sequences is extracted from a templated version of the log data.

* * * * *